(12) United States Patent
Krishnan et al.

(10) Patent No.: US 8,656,024 B2
(45) Date of Patent: *Feb. 18, 2014

(54) TRANSACTIONAL APPLICATION PROCESSING IN A DISTRIBUTED ENVIRONMENT

(75) Inventors: Mayilraj Krishnan, Santa Clara, CA (US); Kollivakkam Raghavan, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 10 days.

This patent is subject to a terminal disclaimer.

(21) Appl. No.: 13/331,315

(22) Filed: Dec. 20, 2011

(65) Prior Publication Data

US 2012/0089738 A1    Apr. 12, 2012

Related U.S. Application Data

(63) Continuation of application No. 11/655,619, filed on Jan. 19, 2007, now Pat. No. 8,103,773.

(51) Int. Cl.
*G06F 15/173* (2006.01)
*H04L 12/28* (2006.01)

(52) U.S. Cl.
USPC .......................................... 709/226; 370/401

(58) Field of Classification Search
USPC ........................................................ 709/206
See application file for complete search history.

(56) References Cited

U.S. PATENT DOCUMENTS

| | | | |
|---|---|---|---|
| 6,289,382 B1* | 9/2001 | Bowman-Amuah | 709/226 |
| 2003/0009530 A1* | 1/2003 | Philonenko et al. | 709/206 |
| 2004/0192339 A1* | 9/2004 | Wilson et al. | 455/456.1 |
| 2010/0302943 A1* | 12/2010 | Rawlins et al. | 370/231 |
| 2011/0258507 A1* | 10/2011 | Rideout | 714/746 |
| 2012/0259722 A1* | 10/2012 | Mikurak | 705/26.1 |

OTHER PUBLICATIONS

Braden, R., et al., "Resource ReSerVation Protocol (RSVP)", Version 1 Functional Specification, Network Working Group, RFC 2205, Sep. 1997, 99 pages.
Openlink, "12. Distributed Transaction Processing (XA)", Copyright 2004 Open Link Software, retrieved from website <http://docs.openlinksw.com/mt/xamt.html>, printed on Jun. 7, 2007, 7 pages.
Sun, "JSRs: Java Specification Requests", Sun Microsystems Copyright 1995-2007, retrieved from website <http://web1.jcp.org/en/jsr/detail?id=156>, printed on Jun. 7, 2007, 4 pages.

* cited by examiner

*Primary Examiner* — Firmin Backer
*Assistant Examiner* — James Edwards
(74) *Attorney, Agent, or Firm* — Hickman Palermo Truong Becker Bingham Wong LLP

(57) ABSTRACT

Transactional application processing in a distributed environment using an application-aware network infrastructure element is described. In an embodiment, an apparatus comprises a plurality of network interfaces, forwarding logic, and transaction manager logic. The plurality of network interfaces is operable to communicatively connect to one or more packet-switched networks. The forwarding logic is coupled to the plurality of network interfaces and, when executed, is operable to receive packet flows therefrom and to forward the packet flows thereto. The transaction manager logic is encoded in one or more tangible media for execution and when executed is operable to: receive first information that specifies one or more remote resources associated with an extended transaction, where the extended transaction comprises a plurality of child transactions; and reserve the one or more remote resources by sending out one or more reservation requests over a network management protocol.

28 Claims, 4 Drawing Sheets

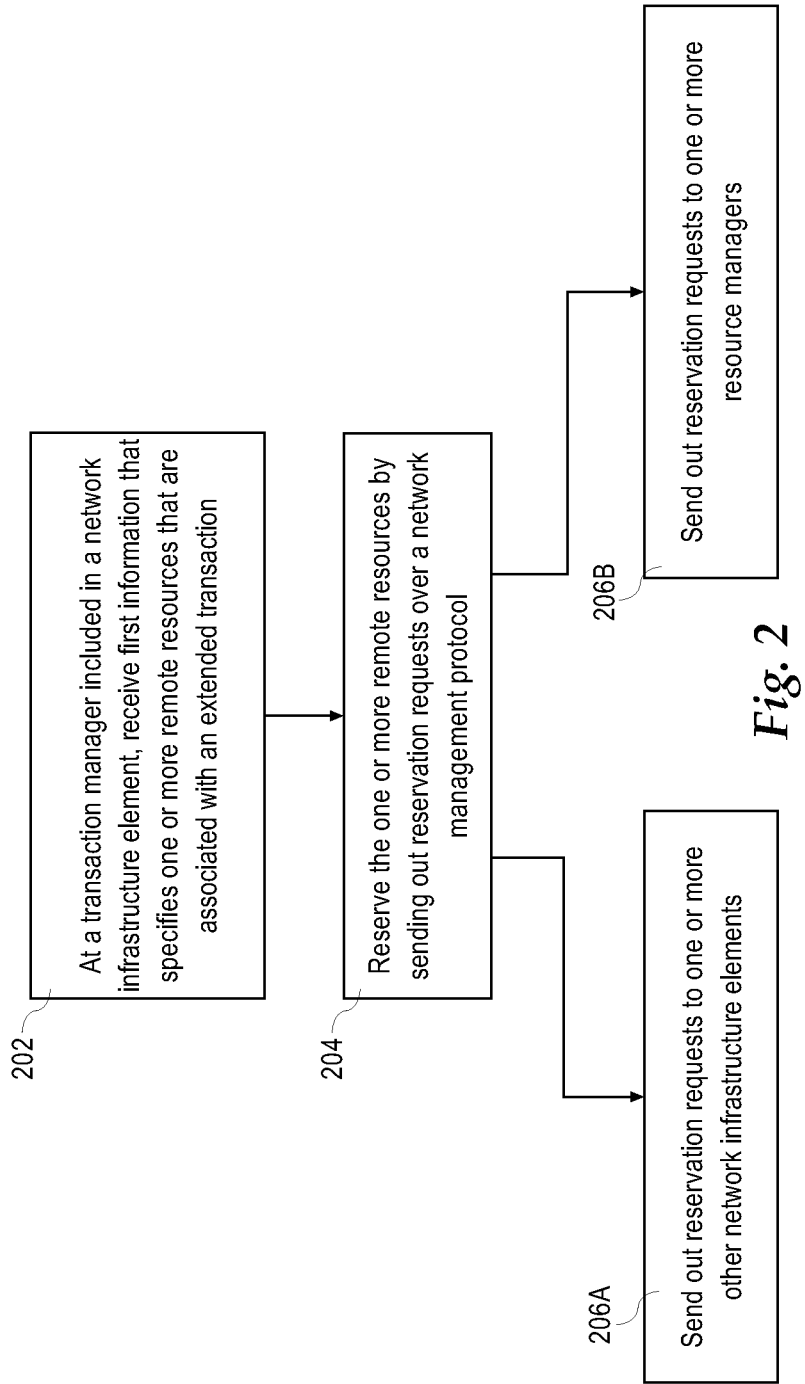

TRANSACTIONAL APPLICATION PROCESSING IN A DISTRIBUTED ENVIRONMENT

BENEFIT CLAIM

This application claims the benefit under 35 U.S.C. §120 as a continuation of application Ser. No. 11/655,619, filed Jan. 19, 2007 now U.S. Pat. No. 8,103,773, the entire contents of which are hereby incorporated herein by reference for all purposes as if fully set forth herein. The applicants hereby rescind any disclaimer of claim scope in the parent application or the prosecution history thereof and advise the USPTO that the claims in this application may be broader than any claim in the parent application.

TECHNICAL FIELD

The present disclosure relates generally to network communications.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Traditional centralized application systems handle the fundamental transaction aspects of application processing (such as, for example, Atomicity, Consistency, Isolation, and Durability (ACID) properties) very effectively. However, with respect to transaction management, distributed application systems pose a set of problems not encountered in centralized systems. For example, a distributed application system may include many computer components connected by some communication network; thus, the distributed application system is more vulnerable to the failures of components such as server nodes, network links, operating systems, and application services. In turn, such failures may often lead to abnormal behavior during application execution and may adversely affect various aspects of transaction management.

In distributed application systems, transaction management is typically provided by components that execute in the application layer. For example, all the logic for transaction management in a distributed application system is typically embedded in a transaction service Application Programming Interface (API), which is provided by an end station such as, for example, by a distributed transaction server executing on a host computer system. The transaction service API would typically provide calls for initiating/completing transactions and for controlling various resource managers that are operable to manage the resources participating in initiated transactions. However, since such transactions typically involve resources distributed across one or more networks, failures of various network components such as server nodes, network links, operating systems, and application services are more difficult to detect. This may cause uncertainty about resource availability, which in turn may adversely affect transaction management and execution.

BRIEF DESCRIPTION OF THE DRAWINGS

The techniques for transactional application processing in a distributed environment using an application-aware network infrastructure element described herein are illustrated by way of example, and not by way of limitation, in the figures of the accompanying drawings and in which like reference numerals refer to similar elements and in which:

FIG. 2 illustrates an example method for transactional application processing in a network infrastructure element.

DESCRIPTION OF EXAMPLE EMBODIMENTS

Figure 1A:
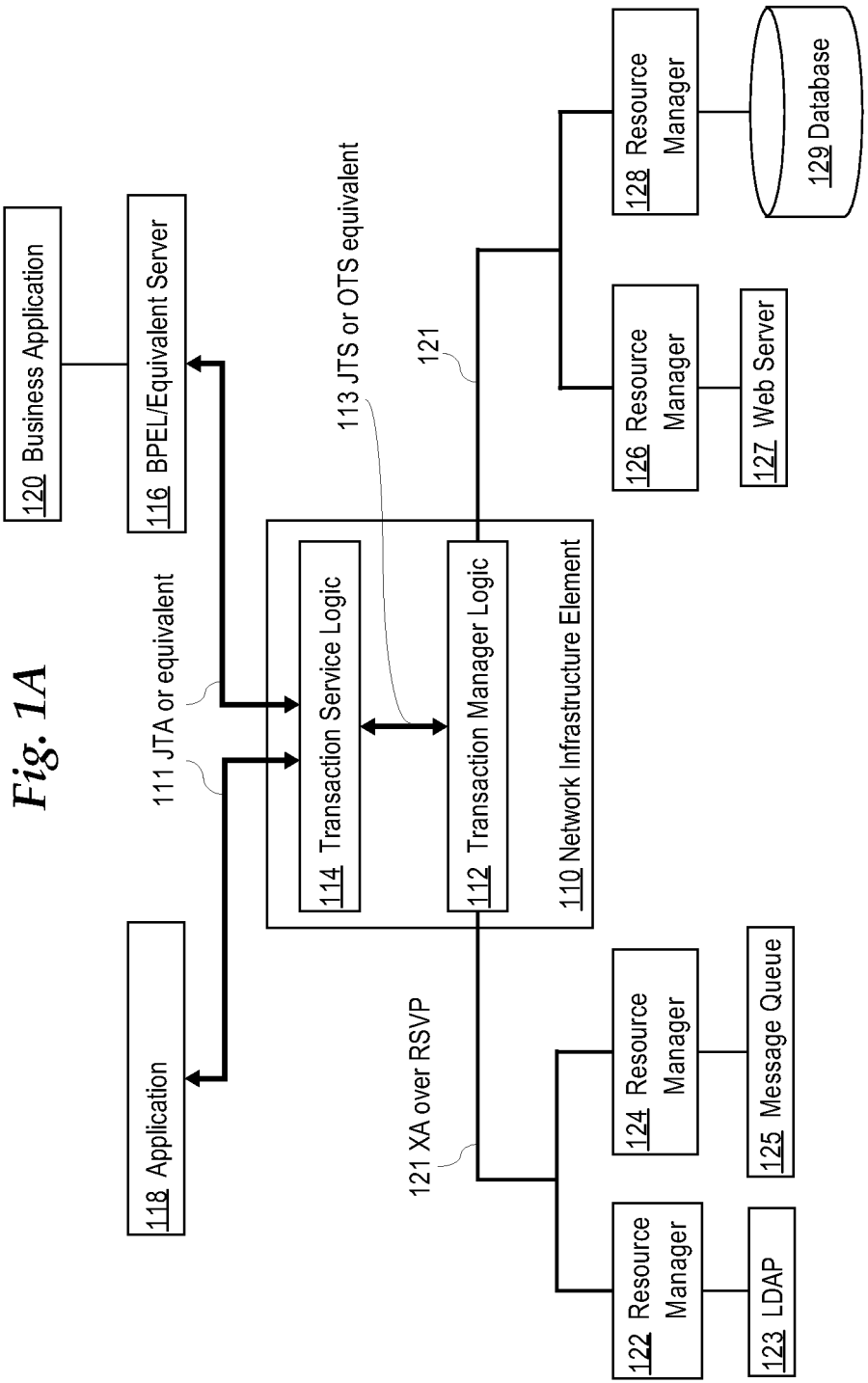
FIG. 1A illustrates an example network infrastructure element operable to perform transactional application processing.

Techniques for transactional application processing in a distributed environment using an application-aware network infrastructure element are described. In the following description, for the purposes of explanation, numerous specific details are set forth in order to provide a thorough understanding of the present invention. It will be apparent, however, to one skilled in the art that the present invention may be practiced without there specific details. In other instances, well-known structures and devices are shown in block diagram form in order to avoid unnecessarily obscuring the present invention.

Embodiments are described herein according to the following outline:

1.0 General Overview
  2.0 Structural Overview
  3.0 Transactional Processing in a Distributed Environment
    3.1 Functional Overview
    3.2 Extended Transaction Resources
    3.3 Reserving Resources and RSVP Extensions
    3.4 Distributed Resource Reservation
    3.5 Additional Features and Alternative Embodiments
  4.0 Implementation Mechanisms—Hardware Overview
  5.0 Extensions and Alternatives

1.0 General Overview

Transactional application processing in a distributed environment using an application-aware network infrastructure element is described. In an embodiment, an apparatus comprises a plurality of network interfaces, forwarding logic, and transaction manager logic. The plurality of network interfaces is operable to communicatively connect to one or more packet-switched networks. The forwarding logic is coupled to the plurality of network interfaces and, when executed, is operable to receive packet flows therefrom and to forward the packet flows thereto. The transaction manager logic is encoded in one or more tangible media for execution and when executed is operable to: receive first information that specifies one or more remote resources associated with an extended transaction, where the extended transaction comprises a plurality of child transactions; and reserve the one or more remote resources by sending out one or more reservation requests over a network management protocol.

In some embodiments, the apparatus may be a network infrastructure element such as, for example, a router or a switch. The network management protocol over which the one or more reservation requests are sent may be thru Resource Reservation Protocol (RSVP). The extended transaction may comprise child transactions that include ACID transactions and/or business application transactions.

Other embodiments comprise one or more computer-readable media encoded with logic for transactional application processing in a distributed environment as described herein, where the media is coupled in an application-aware network infrastructure element.

In some embodiments, the techniques for transactional application processing in a distributed environment described herein may be implemented using one or more computer programs executing on a network infrastructure element, such as a switch or a router, that is established in a packet-switched network. In some embodiments, the techniques described herein may be implemented by a computer system that is coupled as a blade to the backplane of a network infrastructure element, such as a router or a switch. Thus, the embodiments described herein are to be regarded in an illustrative rather than a restrictive sense.

2.0 Structural Overview

FIG. 1A illustrates an example network infrastructure element operable to perform transactional application processing in a distributed environment. As used herein, "network infrastructure element" refers to a networking device that is operable to manage network traffic transmitted in one or more networks. Typically, a network infrastructure element is operable to receive packet flows on network interfaces connected to other network infrastructure elements, make a routing or forwarding decision regarding the received packet flows, and transmit the received packet flows on the network interfaces based on the decision. Examples of network infrastructure elements include, but are not limited to, routers, switches, bridges, and hubs.

Referring to FIG. 1A, network infrastructure element 110 comprises transaction manager logic 112 and transaction service logic 114. Network infrastructure element 110 may comprise other components that are not shown in FIG. 1 such as, for example, an Operating System (OS), a plurality of network interfaces, and one or more forwarding logic components that are operable to facilitate routing and/or forwarding functionality. In one embodiment, transaction manager logic 112 and transaction service logic 114 may be implemented as one or more software and/or hardware components that are provided on a blade, which is operatively coupled to the backplane of network infrastructure element 110. In other embodiments, transaction manager logic 112 and transaction service logic 114 may be provided as software components that are executable under the control of the OS of network infrastructure element 110.

In various embodiments, transaction service logic 114 may be implemented as one or more software components that are executable by one or more processors, as one or more hardware components such as Application-Specific Integrated Circuits (ASICs), or as any combination of one or more software and hardware components. Transaction service logic 114 comprises a transaction API, such as, for example, Java Transaction API (JTA) 111 or an equivalent API. Various entities that are communicatively connected to network infrastructure element 110 may invoke the functionalities and API calls provided by JTA 111 in order to perform various transactions. For example, in some embodiments transaction service logic 114 may be operable to perform transactions initiated by standalone applications that are communicatively connected to network infrastructure element 110, such as, for example, application 118. In some embodiments, transaction service logic 114 may be operable to perform transactions initiated by business applications through Business Process Execution Language (BPEL) or equivalent servers that are communicatively connected to network infrastructure element 110, such as, for example, business application 120 and BPEL/Equivalent server 116.

Transaction manager logic 112 is communicatively and/or operatively coupled to transaction service logic 114. In various embodiments, transaction manager logic 112 may be implemented as one or more software components that are executable by one or more processors, as one or more hardware components such ASICs, or as any combination of one or more software and hardware components. Transaction manager logic 112 comprises an Object Transaction Service API, such as, for example, Java Transaction Service (JTS) 113 or an equivalent API. In operation, transaction service logic 114 may invoke JTS calls through JTS 113 as part of performing a transaction initiated through JTA 111.

According to the techniques for transactional application processing in a distributed environment described herein, transaction manager logic 112 when executed is operable to reserve, over a network management protocol, various resources that are necessary to complete extended transactions initiated through transaction service logic 114. As used herein, "network management protocol" refers to any protocol that provides for accessing, distributing, and storing information used to control the operation of network infrastructure elements. Examples of network management protocols include, but are not limited to, RSVP, Simple Network Management Protocol (SNMP), and various protocols for exchanging routing information such as Open Shortest Path First (OSPF), Routing Information Protocol (RIP), Border Gateway Protocol (BGP), Label Distribution Protocol (LDP), and others.

As used herein, "extended transaction" refers to a distributed transaction that involves resources controlled by remote entities, for example, remote end stations such as various computer hosts, remote servers, and remote services. An extended transaction may include a plurality of child transactions that access one or more remote resources. Examples of extended transactions include, but are not limited to, distributed ACID transactions and business application transactions that conform to the Business Transactions Protocol (BTP).

According to the techniques for transactional application processing in a distributed environment described herein, transaction manager logic 112 is operable to receive information that specifies one or more resources that are involved in an extended transaction. For example, transaction manager logic 112 may receive from transaction service logic 114 an XML document that lists one or more child transactions and the resources thereof that participate in the extended transaction. Transaction manager logic 112 is then operable to reserve the specified resources over an RSVP protocol as indicated by reference numeral 121. In some embodiments, transaction manager logic 112 may be operable to send RSVP messages to other network infrastructure elements, where the other network infrastructure elements are operable to cause reservation of resources as requested in the RSVP messages. In other embodiments, transaction manager logic 112 may be operable to communicate over RSVP with various resource managers. As used herein, "resource manager" refers to a combination of hardware and/or software components that are operable to manage and control access to one or more resources. According to the techniques described herein, transaction manager logic 112 is operable to communicate with different types of resource managers and to handle all complexities and details involved in reserving different types of resources therefrom.

For example, according to the techniques described herein, transaction manager logic 112 may be operable to communicate over RSVP with resource manager 122 in order to determine the availability of, or to reserve an entry in, Lightweight Data Access Protocol (LDAP) directory 123. In this embodiment, resource manager 122 may be an LDAP server that provides access to one or more LDAP directories. In another example, transaction manager logic 112 may be operable to communicate over RSVP with resource manager 124 in order to determine the availability of, or to reserve a slot in, message queue 125. In another example, transaction manager logic 112 may be operable to communicate over RSVP with resource manager 126 in order to determine the availability of web server 127 or of any web service provided thereon. In another example, transaction manager logic 112 may be operable to communicate over RSVP with resource manager 128 in order to determine the availability of database 129 or any data objects therein. In this example, resource manager 128 may be a database server operable to manage access to tables and other data structures in one or more databases such as database 129.

3.0 Transactional Processing in a Distributed Environment 3.1 Functional Overview FIG. 2 illustrates an example method for transactional application processing in a network infrastructure element.

In step 202, a transaction manager included in a network infrastructure element receives first information that specifies one or more remote resources that are associated with an extended transaction. For example, in one embodiment a network infrastructure element may comprise a transaction manager and a transaction service coupled thereto. In this embodiment, the transaction service may provide an eXtensible Markup Language (XML) Transactioning API for Java (JAXTX), which allows a business application component to send any other component transactional information in a canonical XML format. In operation, a business application may invoke a JAXTX call to send to the transaction service an XML document that lists all child transactions and resources thereof that participate in an extended transaction. In response, the transaction service may send the XML document in a call to the transaction manager.

In response to receiving the information that specifies the one or more remote resources involved in the extended transaction, the transaction manager may determine the resources and their corresponding resource managers that need to be coordinated. Thereafter, in step 204 the transaction manager reserves the one or more resources by sending out reservation requests over a network management protocol. For example, in one embodiment the network management protocol may be RSVP that has been extended to provide for reserving extended transaction resources. In this embodiment, in order to reserve the one or more remote resources, the transaction manager may send out one or more RSVP messages. Each RSVP message may include a payload portion that stores an RSVP object which specifies one or more resources that need to be reserved.

In various embodiments, the transaction manager may send reservation requests to one or more other network infrastructure elements and/or directly to one or more resource managers that manage various resources. For example, in step 206A the transaction manager may send RSVP messages to one or more remote network infrastructure elements. In response to receiving an RSVP message, a remote network infrastructure element may cause the reservation of a resource specified the message by accessing the resource manager of that resource or by re-sending the RSVP message to another network infrastructure element that is operable to access the resource manager for the resource. In this manner, the transaction manager may facilitate reservation of the remote resources involved in the extended transaction in a distributed manner.

In step 206B, the transaction manager may send one or more reservation requests directly to one or more resource managers that manage some or all of the remote resources participating in the extended transaction. For example, the transaction manager may include one or more RSVP server libraries through which communications with various types of resource managers may be facilitated for the purpose of resource reservation.

Once the transaction manager successfully reserves the remote resources participating in the extended transaction, the transaction manager may notify accordingly the entity that requested the resources. For example, in the embodiment in which the resources are requested through a transaction service that is coupled in the network infrastructure element to the transaction manager, the transaction manager may receive one or more confirmations (from resource managers or from other network infrastructure elements) which indicate that the one or more remote resources are going to be available when the extended transaction is executed. In this embodiment, based on the confirmations the transaction manager may send one or more responses to the transaction service in order to notify the transaction service that the remote resources are available and secured. Thereafter, the transaction service may proceed and perform the extended transaction, and/or any child transaction included therein, knowing that all necessary resources have been secured by the transaction manager and are available to participate in the extended transaction.

3.2 Extended Transaction Resources

As used in this disclosure, "resource" refers to any entity that can participate in a transaction. Examples of resources include, but are not limited to, any servers and availability of connections thereto, any services and availability of calls thereto, data repositories such as databases and directories and data structures and items stored therein, and any operations that may be performed by and/or on a particular entity. Resources may be structural entities—examples of structural entities include without limitation, servers, services, directories, data objects, databases, tables, etc. Resources may also be functional entities—examples of functional entities include without limitation operations, commands, interface calls, and any other mechanisms that may be invoked to perform particular functionalities. The techniques described herein are not limited to any particular types of resources and the examples of resources provided herein are to be regarded in an illustrative rather than a restrictive sense.

For example, in one embodiment an extended transaction may be used to complete an airline reservation. In this embodiment, the extended transaction may include two separate child transactions—one transaction to access an airline reservation system and another transaction to confirm the validity of a credit card provided by a user. Thus, in this embodiment the resources involved in the extended transaction may include a connection to the airline reservation system and a credit card confirmation that may be obtained through a web service. In operation, a business application operable to perform airline reservations may list these two child transactions and the resources thereof in an XML document that describes the extended transaction used to complete the airline reservation. The XML document is sent to a transaction manager included in a network infrastructure element; thereafter, before the extended transaction is performed, the transaction manager would determine the availability of, and reserve, the resources by using a network management protocol. For example, the transaction manager may open a connection to the airline reservation system and may contact an LDAP server to confirm the validity of the user-provided credit card.

In some embodiments, an XML document that describes an extended transaction may include various additional elements depending on the specific task that needs to be performed. For example, the XML document may include passwords needed to establish connections, user-specific information, and policies that need to be applied to a resource or by a resource manager thereof. In these embodiments, various user-defined or standard XML elements may be used to allow additional information to be overlaid over transaction metadata that describes the extended transaction and to allow for different instantiations of the XML document on a per-user basis.

In some embodiments, the resources reserved by a transaction manager in a network infrastructure element need not necessarily be physical resources such as, for example, a server. Rather, the resources themselves may be functional entities such as a web service call. For example, in a credit card authorization transaction, a resource may be a call to a VISA web service to obtain a temporary authorization for a certain amount on a specified credit card (even though such authorization and the certain amount may have not yet been requested by the business application that initiated the transaction). Before the business application executes the transaction, the transaction manager may obtain the temporary authorization by performing a web service call which, when returned successfully, may indicate that the temporary authorization for the certain amount is reserved successfully.

According to the techniques for transactional application processing in a distributed environment described herein, the resources involved in an extended transaction may depend on the infrastructure that is being utilized. For example, the techniques described herein may be implemented with respect to business applications and services conforming to a Service-Oriented Architecture (SOA) standard, as well as to client-server applications developed using conventional distributed software standards.

According to the techniques described herein, a transaction manager in a network infrastructure element may use a network management protocol, such as RSVP, to reserve resources in such a way that an extended transaction can be fulfilled end-to-end. For example, a transaction manager included in the network infrastructure element ensures that an application initiating an extended transaction would not commence three child transactions only to find out that a fourth child transaction included in the extended transaction cannot be completed for lack of availability of a remote resource involved therein.

3.3 Reserving Resources and RSVP Extensions

In one embodiment, a transaction manager included in a network infrastructure element is operable to reserve resources over RSVP. Conventionally, RSVP is a resource reservation setup protocol designed for quality integrated services over the Internet. RSVP is used by a host to request specific qualities of service from the network for particular application data streams or traffic flows. RSVP is also used by network infrastructure elements to deliver quality-of-service (QoS) requests to all nodes along the path(s) of the traffic flows and to establish and maintain state to provide the requested service. RSVP requests generally result in resources being reserved in each network infrastructure element along the traffic flow path, where the resources are transmission bandwidth for specified traffic flows and the sizes of various buffers in the network infrastructure elements that are used when the traffic flows pass through.

According to the techniques for transactional application processing in a distributed environment described herein, in this embodiment the RSVP protocol capabilities are extended to provide support for reserving transaction-related resources. For example, new RSVP objects may be defined to specify various types of transaction-related resources. The new RSVP objects may be transmitted in regular RSVP messages exchanged between network infrastructure elements. When a network infrastructure element receives an RSVP message, the OS of the network infrastructure element or an application executing thereon would examine the objects included in the message. If the RSVP message is determined to include an RSVP object that specifies the reservation of a transaction-related resource, the OS of the network infrastructure element or the application executing thereon would determine the type of the requested resource and the extended transaction in which the resource participates. Thereafter, the information in the RSVP object may be sent to a transaction manager included in the network infrastructure element to facilitate the reservation of the specified resource; alternatively or in addition, the information in the RSVP object may be sent to a different network infrastructure element that is operable to cause reservation of the resource. Thus, according to the techniques described herein RSVP is extended to support reservation of transaction-related resources without changing any routing protocols on which RSVP relies or anything else related to the use of RSVP with regards to reserving bandwidth.

According to the RSVP extension described herein, the payload of an RSVP message may include, in one or more RSVP objects, the identity of a resource that needs to be reserved, and/or one or more operations that need to be performed by a network infrastructure element or a resource manager in order to reserve a resource. In one embodiment, a transaction manager included in a network infrastructure element may receive an XML document describing an extended transaction and, based on the XML document, may determine the remote resources that need to be reserved. Thereafter, the transaction manager may generate one or more RSVP messages that include one or more RSVP objects that specify the remote resources, and may send the one or more RSVP messages to RSVP-enabled resource managers and/or to other network infrastructure elements in order to cause reservation of the resources.

In one embodiment, a transaction manager included in a network infrastructure element may be operable to reserve resources specified in RSVP messages received at the network infrastructure element. For example, the transaction manager or another component of the network infrastructure element may determine that a resource specified in a RSVP message may be reserved by accessing a resource manager that is located in the same subnet as the network infrastructure element. In this case, the transaction manager may request the resource from the resource manager over RSVP (if the resource manager is RSVP-enabled) or over any other transaction/resource specific protocol. Alternatively, the transaction manager or the other component of the network infrastructure element may determine that reservation of the resource specified in the RSVP message can be facilitated through another network infrastructure element. In this case, the RSVP message specifying the resource may be re-sent to the other network infrastructure element, which in turn would process the message and decide on the appropriate manner (e.g. accessing the resource manager or re-sending the RSVP message) for reserving the resource.

In some embodiments, a transaction manager included in a network infrastructure element may comprise one or more RSVP server libraries that are used to directly communicate with various types of resource managers for the purpose of reserving resources provided therein. The RSVP server libraries in the transaction manager may be operable to handle all the logic and semantics necessary to access any particular type of resource manager to reserve a resource provided thereby. For example, the RSVP server libraries in the transaction manager may comprise a particular database driver, LDAP client, or web client through which a particular database server, LDAP server, or web server may be accessed, respectively. In some embodiments, a resource manager may be RSVP-enabled by comprising one or more RSVP client libraries that may be used for communicating with a transaction manager in a network infrastructure element. In these embodiments, a resource manager may include any clients and/or logic necessary to receive RSVP messages from a transaction manager in a network infrastructure element, and to process the RSVP messages in order to reserve the resources specified therein. Thus, the techniques for transactional application processing in a distributed environment described herein are not limited to any particular mechanism by which transaction managers in network infrastructure elements may communicate with resource managers in order to reserve or cause reservation of extended transaction resources.

According to the techniques described herein, in one embodiment a network infrastructure element may provide a particular network address and port on which a transaction service and/or or a transaction manager included in the network infrastructure element may be accessed by outside applications. In one operational example, the particular network address and port may be used by a business application or a BPEL/equivalent server to request execution of a particular extended transaction. The business application or the BPEL server may submit to the transaction service and/or the transaction manager an XML document that specifies the child transactions and resources included in the particular extended transaction. Based on the XML document, the transaction manager may reserve the resources over the network thru a management protocol such as RSVP, and may notify the transaction service accordingly. The transaction service may then proceed with performing the extended transaction on behalf of the business application or the BPEL/equivalent server.

In one embodiment, the techniques described herein may be implemented in a manner that is transparent to the entities that initiate extended transactions. For example, in this embodiment a BPEL server may make a service call to another server. The network infrastructure element or a component thereof may examine messages that pass through and intercept any BPEL server messages. When the network infrastructure element or the component thereof intercept one or more messages indicating a call from the BPEL server that requests resources for an extended transaction, the information identifying the resources is passed to the transaction manager included in the network infrastructure element. For example, the call from the BPEL server may be a JAXTX call that specifies transaction-related information. The transaction manager may then reserve the specified resource over a network management protocol such as RSVP as described herein. When the transaction manager receives confirmation that the requested resources are secured at the corresponding resource managers, the transaction manager or a transaction service included in the network infrastructure element may notify the BPEL server that it can proceed with the extended transaction. In this manner, the techniques for transactional application processing in a distributed environment described herein may be used to transparently provide reservation services to BPEL or other application servers without requiring that the servers be able to understand any of the underlying reservation semantics.

3.4 Distributed Resource Reservation

Figure 1B:
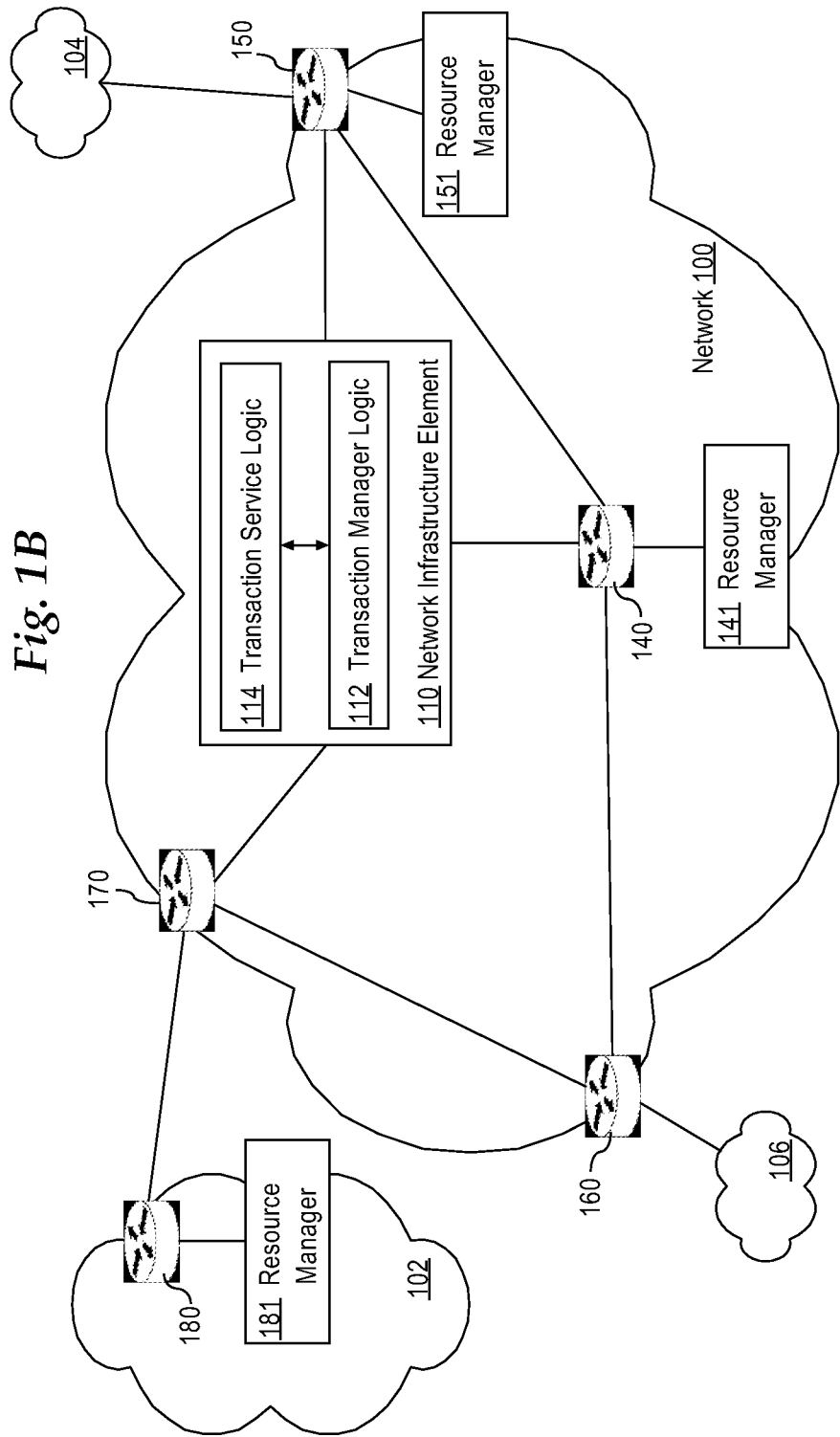
FIG. 1B illustrates an example operational context for transactional application processing in a distributed environment.

FIG. 1B illustrates an example operational context for transactional application processing in a distributed environment.

Network infrastructure element 110 and routers 140, 150, 160, and 170 are configured to route traffic in and through network 100. Network infrastructure element 110 is a router that comprises transaction service logic 114 and transaction manager logic 112. As described with respect to FIG. 1A, transaction service logic 114 is operable to perform transactions initiated by applications that are operable to communicatively connect to network infrastructure element 110. Transaction manager logic 112 is communicatively and/or operatively coupled to transaction service logic 114 and is operable to reserve, over a network management protocol such as RSVP, various resources that are necessary to complete extended transactions initiated through transaction service logic 114.

Router 140 is an internal router communicatively connected to network infrastructure element 110 and to border routers 150 and 160. Router 140 may comprise a transaction manager and a transaction service similar to network infrastructure element 110. Router 140 is communicatively connected to resource manager 141, which manages access to one or more resources that may participate in extended transactions.

Router 150 is a border router communicatively connected to network infrastructure element 110 and to internal router 140. Router 150 is operable to receive traffic flows from other routers in network 100 and to route the traffic flows to network 104; router 150 is also operable to receive traffic flows from network 104 and to route the traffic flows to or through network 100. Router 150 may comprise a transaction manager and a transaction service similar to network infrastructure element 110. Router 150 is communicatively connected to resource manager 151, which manages access to one or more resources that may participate in extended transactions.

Router 160 is a border router communicatively connected to internal router 140 and border router 170. Router 160 is operable to receive traffic flows from other routers in network 100 and to route the traffic flows to network 106; router 160 is also operable to receive traffic flows from network 106 and to route the traffic flows to or through network 100. Router 170 is a border router communicatively connected to network infrastructure element 110, border router 160, and border router 180 that is established in network 102. Router 170 is operable to receive traffic flows from other routers in network 100 and to route the traffic flows to router 180 in network 102; router 170 is also operable to receive traffic flows from border router 180 and to route the traffic flows to or through network 100. Routers 160 and 170 may comprise a transaction manager and a transaction service similar to network infrastructure element 110.

Router 180 is a border router established in network 102 and communicatively connected to border router 170. Router 180 is operable to receive traffic flows from other routers in network 102 and to route the traffic flows to router 170 in network 100; router 180 is also operable to receive traffic flows from router 170 and to route the traffic flows to or through network 102. Router 180 may comprise a transaction manager and a transaction service similar to network infrastructure element 110. Router 180 is also communicatively connected to resource manager 181, which manages access to one or more resources that may participate in extended transactions.

According to the techniques for transactional application processing in a distributed environment described herein, extended transaction resources may be reserved in a distributed manner by any of the transaction managers included in network infrastructure element 110 and routers 140, 150, 160, 170, and 180. For example, transaction service logic 114 in network infrastructure element 110 may receive (on a network address and port dedicated for that purpose on network infrastructure element 110) a request to perform an extended transaction. The request may include an XML document that describes the child transactions and the resources included in the extended transaction. Transaction service 114 passes the XML document to transaction manager 112, and transaction manager 112 determines that the extended transaction involves resources managed by resource managers 141 and 181. Transaction manager 112 then generates RSVP messages that identify the specified resources, and sends these messages to routers 140 and 170.

Upon receipt of the RSVP message from network infrastructure element 110, router 140 or a component thereof examines the message and determines that a reservation of a resource managed by resource manager 141 is requested. The RSVP message is then passed to the transaction manager in router 140, which communicates with resource manager 141 to reserve the resource. Thereafter, the transaction manager in router 140 sends the result (success or failure) of the reservation operation in an RSVP message to network infrastructure element 110, which sends the message to transaction manager logic 112, which in turn notifies transaction service 114 accordingly.

Upon receipt of the RSVP message from network infrastructure element 110, router 170 or a component thereof examines the message and determines that the resource specified therein may be accessible by router 180 in network 102. Router 170 or the component thereof then re-sends the RSVP message to router 180. Router 180 receives the RSVP message and determines that the resource specified therein is managed by resource manager 181. The RSVP message is then passed to the transaction manager in router 180, which communicates with resource manager 181 to reserve the resource. Thereafter, the transaction manager in router 180 sends the result (success or failure) of the reservation operation in an RSVP message to router 170, which examines the message and resends it to network infrastructure element 110. Network infrastructure element 110 or a component thereof receives the response RSVP message and passes it to transaction manager logic 112, which in turn notifies transaction service 114 accordingly.

In the above approach, the techniques for transactional application processing in a distributed environment described herein allow transaction manager 112 to cause reservation of extended transaction resources in a distributed manner. RSVP messages send from a transaction manager are received at other network infrastructure elements and/or transaction managers thereof, which examine the messages and determine whether to contact resource managers to reserve the specified resources or whether to re-send the RSVP messages to other network infrastructure elements that in turn may process the messages to determine how to cause reservation of the requested resources. The above approach for transactional application processing is more resilient in handling transaction reservations since regular servers go down mode often than network infrastructure elements. Moreover, network infrastructure elements are more robust and scale better than regular servers, and also provide for better extensibility. By utilizing a transaction manager that is included in a network infrastructure element, the transaction manager functionality does not need to be performed by using end-to-end connections over a wide-area network (WAN), and the administrative overhead of maintaining a separate transaction management server at remote sites is avoided. Furthermore, in the above approach the transaction manager functionality is distributed among multiple network infrastructure elements, which enhances robustness and the ability to participate in complex transactions in a distributed way, as opposed to traditional approaches that require a central transaction management coordinator to connect—possibly over slow WAN links—to all necessary resource managers.

3.5 Additional Features and Alternative Embodiments

The techniques for transactional application processing in a distributed environment described herein provide for simplified distributed transaction processing. According to the techniques described herein, a transaction manager in a network infrastructure element communicates with a resource manager that manages resources participating in extended transactions. The logic in the transaction manager controls resource reservation as well as any logic for determining courses of action when a resource becomes unavailable. This allows resource managers, as well as business applications that initiate extended transactions to include less transactions-aware logic.

In many embodiments, the main issues with distributed transactions are recoverability and determination of what measures to take when a resource goes down. For example, a connection to a database server may be blocked. According to the techniques described herein, a transaction manager included in a network infrastructure element would have a very good idea when a resource is up or down. In this way, the transaction manager or another component of the network infrastructure element (e.g. a transaction service) can easily notify the resource requester that the requested resource is unavailable. If an application uses a two-phase commit, the application would know in advance that a resource it needs is not available. In contrast, in traditional approaches for distributed transaction management, a resource manager may be able to reserve a resource but would not be able to detect when the resource goes down—for example, a resource manager may ensure that a connection to a database server can be established, but by the time the data server is needed it may have gone down and the resource manager would have no way to detect this or to inform the entity that requested the resource. Thus, the techniques for transactional application processing in a distributed environment described herein provide for better resource control and resource availability determination.

The techniques described herein also provide for offloading the capability of supporting distributed transactions to the network and the network infrastructure elements established therein. Contrary to traditional approaches that provide for transaction management by end station applications and servers, the techniques described herein provide for robust transaction management by logic that operates at the network layer. This is advantageous from the perspective of business applications since network infrastructure elements would handle the details and semantics of resource reservation and transaction processing instead of the business applications themselves. For example, the application layer (with respective to a communication stack) at which a business application executes no longer needs to provide logic for handling the transaction management and semantics involved in resource reservation.

The techniques for transactional application processing in a distributed environment described herein also provide for reliable resource participation and scaling for multimedia applications. Traditionally, RSVP is used to reserve bandwidth for multimedia applications and to guarantee throughput. According to the techniques described herein, a transaction manager in a network infrastructure element may reserve the resources participating in complex transactions in a particular order. For example, the resources for a first child transaction of an extended transaction may be reserved first, the resources for a second transaction may be reserved second, and so on based on an order of the child transactions that is specified in an XML document that describes the extended transaction. In addition, the techniques described herein allow the capability to seamlessly incorporate multimedia interactive data and transaction data that may be required by complex applications. The reason for this is that a network infrastructure element would be able to handle extended RSVP in the same way with respect to both transaction resource reservations and traditional bandwidth reservation for multimedia applications.

The techniques for transactional application processing in a distributed environment described herein also provide for transaction management that includes custom function parameters and filters as programmable custom extensions. Traditionally, RSVP allows filter definitions for filters that filter traffic based on the source and/or destination addresses and other parameters. According to the techniques described herein, similar filters can be defined for transaction resource reservation that is performed over RSVP. Thus, the new RSVP features described herein provide for extending the traditional capabilities of distributed transaction management. For example, by using the mechanisms for filter definition provided in RSVP, custom filters with programmable parameters may also be defined for transaction resource reservations.

The techniques for transactional application processing in a distributed environment described herein are not specific to any network environment or operating system, and do not require any changes to routing protocols that are used by network infrastructure elements to manage and route network traffic. Thus, existing network infrastructure elements may be easily reconfigured to provide support for the techniques described herein. For example, in some embodiments, a computer system that includes transaction service logic and transaction manager logic as described herein may be coupled as a blade into an existing network infrastructure element without affecting the normal routing and/or forwarding operations of the network infrastructure element.

Various other features may be included, and various other modifications may be made, to embodiments of the techniques for transactional application processing in a distributed environment described herein. Thus, any and all embodiments and examples described in this disclosure are to be regarded in an illustrative rather than a restrictive sense.

4.0 Implementation Mechanisms—Hardware Overview

Figure 3:
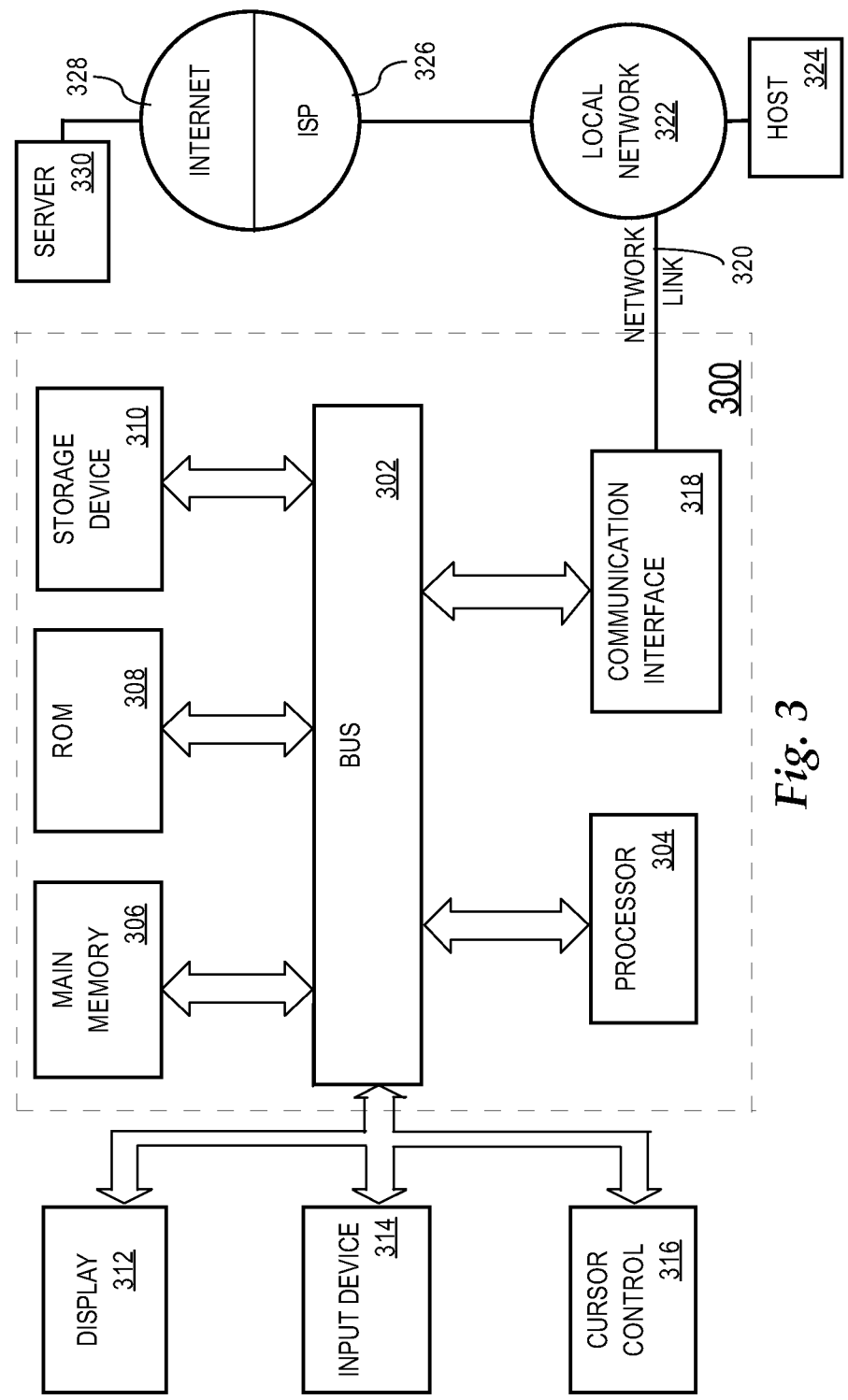
FIG. 3 illustrates a computer system on which embodiments may be implemented.

FIG. 3 illustrates a computer system 300 upon which embodiments of the described techniques for transactional application processing in a distributed environment may be implemented. For example, one embodiment may be implemented using one or more computer programs running on a computer system 300 that is operatively coupled as a blade to the backplane of a network infrastructure element such as, for example, a router or a switch.

Computer system 300 includes a bus 302 or other communication mechanism for communicating information, and a processor 304 coupled with bus 302 for processing information. Computer system 300 also includes a main memory 306, such as a random access memory ("RAM") or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory ("ROM") 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube ("CRT"), for displaying information to a computer user. An input device 314, including alphanumeric and other keys, is coupled to bus 302 for communicating information and command selections to processor 304. Another type of user input device is cursor control 316, such as a mouse, trackball, stylus, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

In one embodiment, computer system 300 is used for transactional application processing in a distributed environment. According to this embodiment, transactional application processing is provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry or other hardware-based logic may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line. Bus 302 can carry the data to main memory 306, from which processor 304 can retrieve and execute the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network ("ISDN") card or a modem to provide a data communication connection to a corresponding type of telephone line. As another example, communication interface 318 may be a local area network ("LAN") card to provide a data communication connection to a compatible LAN. Wireless links may also be implemented.

Network link 320 typically provides data communication through one or more networks to other data devices. For example, network link 320 may provide a connection through local network 322 to a host computer 324 or to data equipment operated by an Internet Service Provider ("ISP") 326. ISP 326 in turn provides data communication services through the world wide packet data communication network now commonly referred to as the "Internet" 328. Local network 322 and Internet 328 both carry digital data streams.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for transactional application processing in a distributed environment as described herein.

The received code may be executed by processor 304 as it is received, and/or stored in storage device 310, or other non-volatile storage for later execution. In this manner, computer system 300 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
   receiving a Resource Reservation Protocol (RSVP) request from an upper-layer application that invokes a Java Transaction API (JTA) call, wherein the request includes first information that specifies one or more transaction-related remote resources that are associated with an extended transaction, wherein the extended transaction comprises a plurality of child transactions;
   invoking a Java Transaction Service (JTS) call for the first information;
   reserving the one or more transaction-related remote resources, which are specified in the first information and are associated with the extended transaction, by sending out one or more reservation requests to any one of:
   one or more resource managers that manage the one or more transaction-related remote resources;
   one or more network infrastructure elements that cause reservation of the one or more transaction-related remote resources, wherein the one or more reservation requests are sent to the one or more network infrastructure elements over the RSVP;
   wherein the method is performed by one or more computing devices.

2. The method of claim 1, wherein each of the one or more reservation requests is an RSVP message that comprises a payload portion storing an RSVP object which specifies reservation of resources that are accessed in extended transactions.

3. The method of claim 1, wherein the method is executed on any one of a router and a switch.

4. The method of claim 1, wherein a particular reservation request of the one or more reservation requests includes any one of: data which specifies a particular remote resource of the one or more remote resources that is to be reserved; data which specifies one or more operations that need to be performed to reserve a particular remote resource of the one or more remote resources.

5. The method of claim 1, wherein the plurality of child transactions includes any one of an ACID transaction and a business application transaction.

6. The method of claim 1, further comprising: receiving responses to the one or more reservation requests; based on the responses, determining whether the one or more transaction-related remote resources are going to be available at the time the extended transaction is executed.

7. The method of claim 1, further comprising sending a particular reservation request to a resource manager that manages a particular remote resource, of the one or more transaction-related remote resources, that is specified in the particular reservation request.

8. The method of claim 1, further comprising sending a particular reservation request of the one or more reservation requests to a remote network infrastructure element, wherein the particular reservation request specifies a particular remote resource of the one or more transaction-related remote resources, and wherein the remote network infrastructure element causes reservation of the particular remote resource.

9. The method of claim 1, further comprising:
   receiving a particular reservation request from a remote network infrastructure element, wherein the particular reservation request specifies a particular resource; and
   causing reservation of the particular resource by any one of:
   re-sending the particular reservation request to a different network infrastructure element; and
   accessing a particular resource manager that manages the particular resource.

10. The method of claim 1, further comprising:
    receiving a first request from an upper-layer application, wherein the first request includes the first information; and
    sending the first information in a second request to transaction manager logic.

11. The method of claim 10, further comprising:
    receiving one or more confirmations that the one or more transaction-related remote resources are going to be available at the time the extended transaction is going to be executed; and
    responding to the second request by informing the transaction manager logic, based on the one or more received confirmations, that the one or more transaction-related remote resources are going to be available at the time the extended transaction is going to be executed.

12. The method of claim 11, wherein the JTA call is made by executing a Java Transaction API; the first request comprises a JTA call invoked by the upper-layer application; the JTS call is made by executing a Java Transaction Service (JTS) API; the second request comprises a JTS call invoked by the JTS API.

13. The method of claim 12, wherein the first information conforms to an eXtensible Markup Language (XML) format; the first information is received in an XML Transactioning API for Java (JAXTX) call invoked by the upper-layer application.

14. The method of claim 1, wherein the one or more transaction-related remote resources include any one of: a slot in a message queue; a storage space in a data structure, wherein the data structure is located in any one of volatile memory and persistent storage; a call to a web service; a connection to a database server; a connection to a web server; a connection to a Lightweight Directory Access Protocol (LDAP) server.

15. A non-transitory computer-readable storage medium storing one or more sequences of instructions which, when executed by one or more processors, cause the one or more processors to perform:
   receiving a Resource Reservation Protocol (RSVP) request from an upper-layer application that invokes a Java Transaction API (JTA) call, wherein the request includes first information that specifies one or more transaction-related remote resources that are associated with an extended transaction, wherein the extended transaction comprises a plurality of child transactions;
   invoking a Java Transaction Service (JTS) call for the first information;
   reserving the one or more transaction-related remote resources, which are specified in the first information and are associated with the extended transaction, by sending out one or more reservation requests to any one of:
   one or more resource managers that manage the one or more transaction-related remote resources;
   one or more network infrastructure elements that cause reservation of the one or more transaction-related remote resources, wherein the one or more reservation requests are sent to the one or more network infrastructure elements over the RSVP.

16. The non-transitory computer-readable storage medium of claim 15, wherein each of the one or more reservation requests is an RSVP message that comprises a payload portion storing an RSVP object which specifies reservation of resources that are accessed in extended transactions.

17. The non-transitory computer-readable storage medium of claim 15, wherein the one or more sequences of instructions are executed by the one or more processors of any one of a router and a switch.

18. The non-transitory computer-readable storage medium of claim 15, wherein a particular reservation request of the one or more reservation requests includes any one of: data which specifies a particular remote resource of the one or more transaction-related remote resources that is to be reserved; data which specifies one or more operations that need to be performed to reserve a particular remote resource of the one or more transaction-related remote resources.

19. The non-transitory computer-readable storage medium of claim 15, wherein the plurality of child transactions includes any one of an ACID transaction and a business application transaction.

20. The non-transitory computer-readable storage medium of claim 15, further comprising additional instructions which, when executed, cause the one or more processors to perform: receiving responses to the one or more reservation requests; based on the responses, determining whether the one or more transaction-related remote resources are going to be available at the time the extended transaction is executed.

21. The non-transitory computer-readable storage medium of claim 15, further comprising additional instructions which, when executed, cause the one or more processors to perform sending a particular reservation request to a resource manager that manages a particular remote resource, of the one or more transaction-related remote resources, that is specified in the particular reservation request.

22. The non-transitory computer-readable storage medium of claim 15, further comprising additional instructions which, when executed, cause the one or more processors to perform sending a particular reservation request of the one or more reservation requests to a remote network infrastructure element, wherein the particular reservation request specifies a particular remote resource of the one or more transaction-related remote resources, and wherein the remote network infrastructure element causes reservation of the particular remote resource.

23. The non-transitory computer-readable storage medium of claim 15, further comprising additional instructions which, when executed, cause the one or more processors to perform:
   receiving a particular reservation request from a remote network infrastructure element, wherein the particular reservation request specifies a particular resource; and
   causing reservation of the particular resource by any one of:
   re-sending the particular reservation request to a different network infrastructure element;
   accessing a particular resource manager that manages the particular resource.

24. The non-transitory computer-readable storage medium of claim 15, further comprising additional instructions which, when executed, cause the one or more processors to perform:
   receiving a first request from an upper-layer application, wherein the first request includes the first information;
   sending the first information in a second request to transaction manager logic.

25. The non-transitory computer-readable storage medium of claim 24, further comprising additional instructions which, when executed, cause the one or more processors to perform:
   receiving one or more confirmations that the one or more transaction-related remote resources are going to be available at the time the extended transaction is going to be executed;
   responding to the second request by informing the transaction manager logic, based on the one or more received confirmations, that the one or more transaction-related remote resources are going to be available at the time the extended transaction is going to be executed.

26. The non-transitory computer-readable storage medium of claim 25, wherein:
   the JTA call is made by executing a Java Transaction API;
   the first request comprises a JTA call invoked by the upper-layer application;
   the JTS call is made by executing a Java Transaction Service (JTS) API;
   the second request comprises a JTS call invoked by the JTS API.

27. The non-transitory computer-readable storage medium of claim 26, wherein: the first information conforms to an eXtensible Markup Language (XML) format; the first information is received in an XML Transactioning API for Java (JAXTX) call invoked by the upper-layer application.

28. The non-transitory computer-readable storage medium of claim 15, wherein the one or more transaction-related remote resources include any one of: a slot in a message queue; a storage space in a data structure, wherein the data structure is located in any one of volatile memory and persistent storage; a call to a web service; a connection to a database server; a connection to a web server; a connection to a Lightweight Directory Access Protocol (LDAP) server.

* * * * *